(12) United States Patent
Ullmann et al.

(10) Patent No.: US 6,205,866 B1
(45) Date of Patent: Mar. 27, 2001

(54) SENSOR ARRANGEMENT FOR DETECTING CHANGES IN ANGLE

(75) Inventors: Thomas Ullmann, Backnang; Anton Dukart, Woerth; Klaus Marx; Franz Jost, both of Stuttgart; Hans-Juergen Herderich, Kernen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/355,042

(22) PCT Filed: Dec. 2, 1998

(86) PCT No.: PCT/DE98/03539

§ 371 Date: Jul. 22, 1999

§ 102(e) Date: Jul. 22, 1999

(87) PCT Pub. No.: WO99/32867

PCT Pub. Date: Jul. 1, 1999

(30) Foreign Application Priority Data

Dec. 20, 1997 (DE) .............................................. 197 57 008

(51) Int. Cl.[7] ...................................................... G01L 3/02
(52) U.S. Cl. .................................... 73/862.333; 324/207.2
(58) Field of Search ........................ 73/862.321, 862.331, 73/862.332, 862.333, 862.334, 862.335; 324/207.2, 207.21

(56) References Cited

U.S. PATENT DOCUMENTS 4,361,805 * 11/1982 Narimatsu et al. ............. 324/207.21
4,724,710   2/1988 Murty .
5,148,106 *  9/1992 Ozawa ............................ 324/207.21
5,501,110   3/1996 Peilloud et al. .

FOREIGN PATENT DOCUMENTS

| 26 58 697 | 9/1979 | (DE) . |
| 44 18 539 A1 | 11/1995 | (DE) . |
| 196 47 420 A1 | 12/1997 | (DE) . |
| 801966 | 9/1958 | (GB) . |
| WO 97/08527 | 3/1997 | (WO) . |

* cited by examiner

*Primary Examiner*—Max Noori
(74) *Attorney, Agent, or Firm*—Michael J. Striker

(57) ABSTRACT

The sensor device accurately measures small angle changes of mechanical parts that rotate relative to each other. The sensor device includes only one cylindrical magnet (3) extending axially from a first part; two magnetoresistive sensors (5',5") mounted on a second part and located in the magnetic field of the sole magnet (3), the two magnetoresistive sensors having respective magnetic field sensitive layers (MS) facing a magnetic pole of the magnet (3), extending tangentially to a rotation direction in which the parts rotate relative to each other and generating respective output signals according to magnetic field line direction; and a device (PT) for combining the respective output signals of the two magnetoresistive sensors (5',5") to produce a combined output signal characteristic of the relative rotation angle of the parts. The combined output signal is set to zero when the parts are at a predetermined relative rotation angle.

7 Claims, 2 Drawing Sheets

SENSOR ARRANGEMENT FOR DETECTING CHANGES IN ANGLE

BACKGROUND OF THE INVENTION

1. Field of the Invention

The present invention relates to a sensor device for detecting small angular position changes and, more particularly, to a sensor device for detecting angular position changes of mechanical parts that rotate relative to each other, especially those angle changes due to the torsion experienced by an axle.

2. Prior Art

From U.S. Pat. No. 5,501,110, a sensor device is already known in which the torque transmitted to an axle is to be detected. The torque is determined by the torsion or the angle of rotation of the ends of the axle and a constant that depends on the material and geometry of the axle. Two magnets and one Hall sensor opposite each magnet are mounted on two disks that each rotate with the axle and are mechanically solidly coupled to the ends of the axle.

For instance, to detect the torque acting on a steering wheel axle of a motor vehicle while the steering wheel is rotating, very small angle changes in both directions of rotation of the steering wheel must be measured. Evaluating the changes in the field originating at the magnets therefore requires an extremely sensitive and also temperature-stable measurement device.

SUMMARY OF THE INVENTION

It is an object of the present invention to provide an improved sensor device of the above-described type, by which small angular position changes of mechanical parts that rotate relative to each other are measured with great sensitivity.

The sensor device for measuring angle changes of mechanical parts that rotate relative to each other includes only one magnet mounted on one part and at least one magnetoresistive sensor mounted on another part opposite to the sole magnet. The at least one magnetoresistive sensor includes means for generating an electrical output signal according to a direction of the magnetic field lines at the magnetoresistive sensor or sensors. The sole magnet and the at least one magnetoresistive sensor are mounted on the respective parts so that a magnetic-field sensitive layer of the at least one magnetoresistive sensor extends so as to face a magnetic pole of the sole magnet. The magnetic-field sensitive layer of the at least one magnetoresistive sensor extends tangentially to a rotation direction in which the parts rotate relative to each other so that the sensor device. Thus the output signal of the at least one magnetoresistive sensor varies in a sensitive manner to a tangential component of the magnetic field.

Because the magnetic field of the magnet extends in the direction toward the respectively opposed sensor, and the sensor is a magnetoresistive sensor, great sensitivity in field line detection is possible. The magnetoresistive sensor is disposed opposite one pole of the magnet in such a away that the magnetic-field-sensitive layer extends tangentially to the rotation direction of the parts whose relative angular position changes. This advantageously exploits the fact that in a tight space (for instance>1 mm) above the pole of the magnet, a major change in the direction of the field lines occurs.

The magnetoresistive sensors according to the invention are controlled linearly because of their pronounced sensitivity to a directional component (in this case tangential) of the field lines and thus make it possible to measure very small angle changes upon a rotation of the magnet or of the sensor.

A preferred embodiment of the invention is based on a sensor device for detecting the torque in an axle that is known per se from U.S. Pat. No. 5,501,110 cited above. Here, the magnet and the sensor are each mechanically coupled to axially different points of the axle and face one another in such a way that torsion of the axle can be detected as an angle change.

In an advantageous embodiment, the measurement device can be realized in that two sensors are disposed in the magnetic field of the magnet and are interconnected in such a way that their differential output without an angle change can be set to zero. The zero point is present if the rotating axle is unloaded. A relative rotation of the parts with the magnets and the sensors causes a difference in the electrical analog outputs of the two sensors, which can be output directly as torque by means of electronic signal processing.

The magnet can be constructed cylindrically with axial magnetization, and the magnetoresistive sensor is preferably an AMR sensor (AMR=anisotropic magnetoresistive), a GMR sensor (GMR=giant magnetoresistive), or a CMR sensor (CMR=colossal magnetoresistive).

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
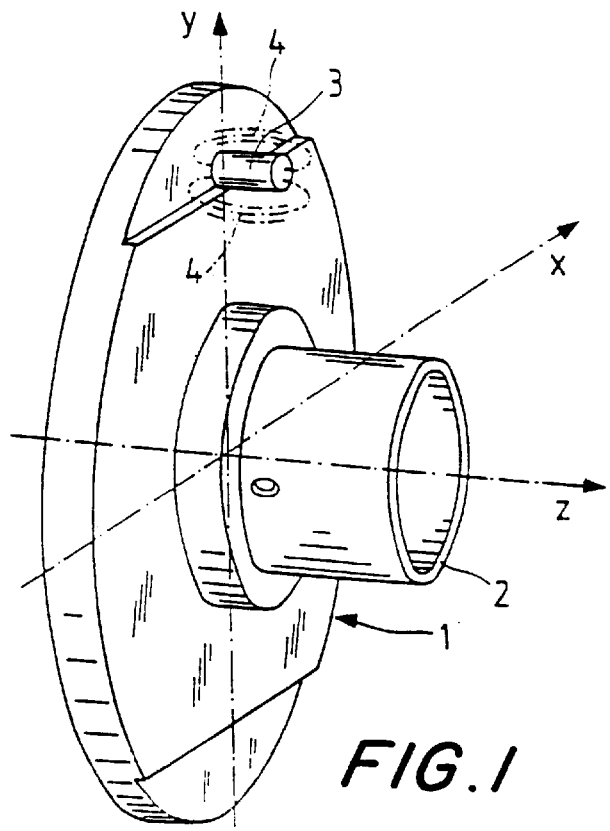
FIG. 1 is a schematic perspective view of one part of a mechanical component or device on which a magnet of the sensor device for measuring small angular position changes according to the invention is mounted.

In FIG. 1, a carrier part 1 is shown, which is secured by a shaft 2 to a rotating axle not shown here. The carrier part 1 rotates with the axle about the coordinate z. A cylindrical magnet 3 is located on the circumference of the carrier part 1, and its field lines 4 extend here as shown. By means of a rotation of the axle, the magnet 3 with the field lines 4 can be deflected at an angle in the x-y plane.

Figure 2:
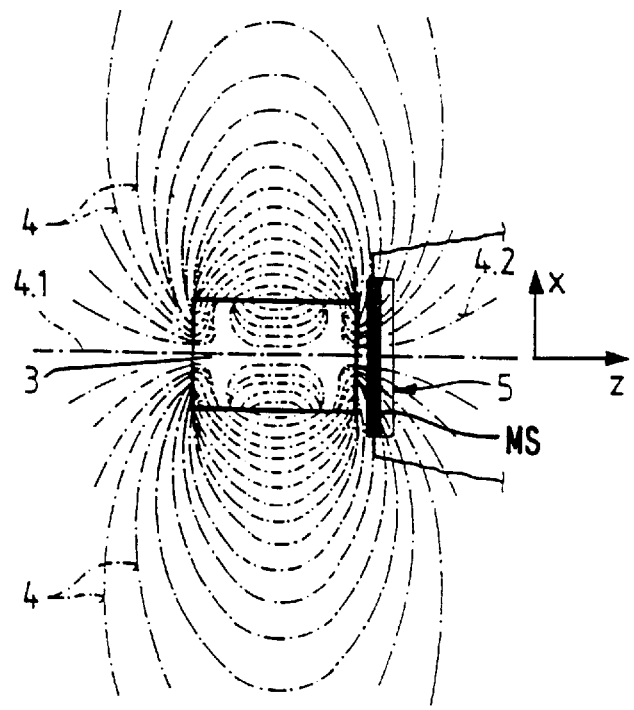
FIG. 2 is a side schematic view of the sensor device according to FIG. 1 showing the magnetic-field sensitive layer of the magnetoresistive layer extending tangentially to the rotation direction of the parts.

In FIG. 2, the magnet 3 with the field lines 4 is shown in detail. A magnetoresistive sensor 5 is disposed facing one pole of the magnet 3. For the sake of greater simplicity, no attempt has been made to show a cohesive view of the disposition of the carrier part 1 with a corresponding carrier part for the sensor 5.

However, it can be seen from FIG. 2 how the sensor 5 must be disposed so that it comes to be located in the region of the field lines 4. The carrier part for the sensor 5 is secured to a different end of the axle from the carrier part 1, so that a relative rotation of the magnet 3 and the sensor 5, caused by torsion of the axle, can be measured.

Since the magnetoresistive sensor 5 has a particular sensitivity for the x component of the field lines 4, a rotation of one of the two components 3 or 5 about the z axis, even at small angle changes, is already expressed by a major change in the output signal of the sensor 5.

It can be seen from FIG. 2 that the field line 4.1, for instance, has an x component of zero, and thus the immediately adjacent field line 4.2 already experiences a readily measurable increase in its x component. Thus in particular small angle changes, which occur at the relatively slight torsion, become measurable, and a precise determination of the torque acting on the axle is possible.

For optimum sensitivity magnetic-field sensitive layer MS of the sensor 5 is arranged extending tangentially to the direction of rotation of the carrier part as shown in FIG. 2.

Figure 3:
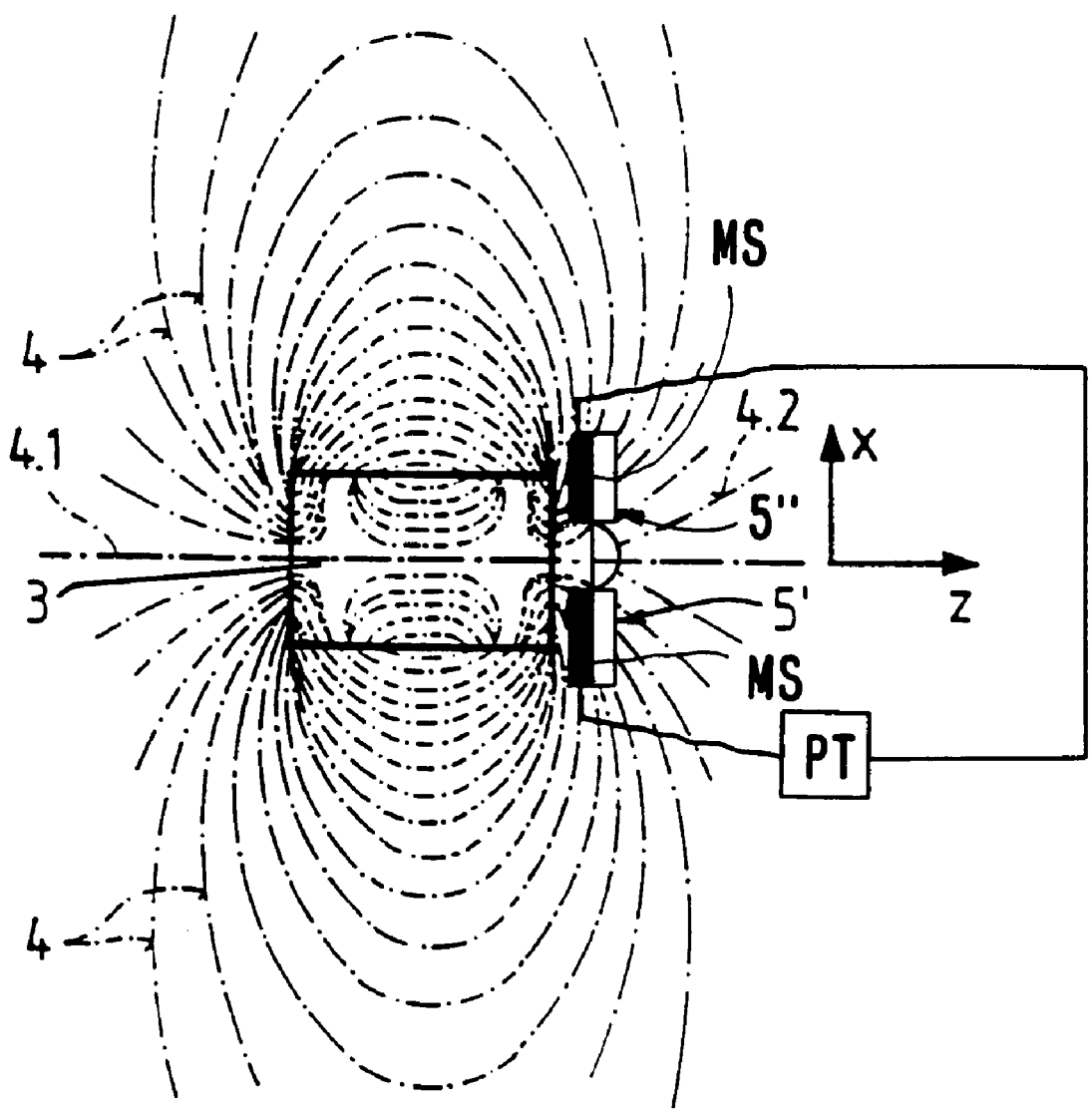
FIG. 3 is a side schematic view of another embodiment of the sensor device for measuring small angular position changes according to the invention including two sensors.

In the embodiment shown in FIG. 3, which is similar to FIG. 2, two magnetoresistive sensors 5' and 5" are connected with each other and with a device PT. The device PT adjusts the differential output of the connected sensors 5' and 5" so that it is zero when there is no change in the relative angular position of the carrier part on which the magnet is mounted (as shown in FIG. 1) and the other corresponding carrier part on which the two magnetoresistive sensors 5' and 5" are mounted.

What is claimed is:

1. A sensor device for measuring angle changes of mechanical parts that rotate relative to each other, said sensor device comprising only one magnet (3) mounted on a first part and producing a magnetic field consisting of magnetic field lines (4; 4.1,4.2) and having a magnetic pole; and at least one magnetoresistive sensor (5; 5',5") mounted on a second part and in said magnetic field lines opposite said only one magnet (3), said second part being rotatable relative to said first part;

wherein said at least one magnetoresistive sensor has a magnetic-field sensitive layer (MS) facing said magnetic pole of said only one magnet (3) and extending tangentially to a rotation direction in which said parts rotate relative to each other, said at least one magnetoresistive sensor (5, 5',5") comprising means for generating an electrical output signal according to a direction of said magnetic field lines at said at least one magnetoresistive sensor, whereby said output signal depends on a relative rotational angular position of said parts.

2. The sensor device as defined in claim 1, wherein said at least one magnetoresistive sensor (5, 5',5") comprises an anisotropic magnetoresistive sensor, a giant magnetoresistive sensor or a colossal magnetoresistive sensor.

3. The sensor device as defined in claim 1, wherein said only one magnet (3) is cylindrical and has axial magnetization.

4. The sensor device as defined in claim 1, wherein said mechanical parts are mounted on respective portions of an axle and further comprising means for mounting said only one magnet (3) on said axle at a first position and means for mounting said at least one magnetoresistive sensor (5; 5',5") on said axle at a second position spaced axially from said first position, so that said at least one magnetoresistive sensor faces said magnetic pole of said only one magnet (3) and detects torsional motion of said axle.

5. A sensor device for measuring angle changes of mechanical parts that rotate relative to each other, said sensor device comprising only one magnet (3) mounted on a first part and producing a magnetic field consisting of magnetic field lines (4; 4.1,4.2) and having a magnetic pole; and two magnetoresistive sensors (5',5") mounted on a second part so as to be located in said magnetic field lines opposite said only one magnet (3), said two magnetoresistive sensors having respective magnetic field sensitive layers (MS) facing the magnetic pole of said only one magnet (3) and extending tangentially to a rotation direction in which the parts rotate relative to each other, said two magnetoresistive sensors (5',5") comprising means for generating respective electrical output signals according to respective directions of said magnetic field lines relative to said magnetoresistive sensors, whereby said respective output signals depend on a relative rotational angular position of said parts; and means (PT) for combining said respective output signals of said two magnetoresistive sensors (5',5") so as to produce a combined output signal that is set to zero when said parts are arranged at a predetermined relative rotation angle with respect to each other.

6. The sensor device as defined in claim 5, wherein said magnetoresistive sensors (5; 5',5") each comprise an anisotropic magnetoresistive sensor, a giant magnetoresistive sensor or a colossal magnetoresistive sensor.

7. The sensor device as defined in claim 5, wherein said only one magnet (3) is cylindrical and has axial magnetization.

* * * * *